United States Patent [19]

Cohen

[11] 4,074,997

[45] Feb. 21, 1978

[54] PLANT PLUG

[76] Inventor: Merrill Cohen, 3418 Edcrest Road, Baltimore, Md. 21207

[21] Appl. No.: 697,028

[22] Filed: June 17, 1976

[51] Int. Cl.² .............................................. C05F 11/02
[52] U.S. Cl. ........................................ 71/24; 71/64 R; 71/64 G; 119/3; 47/58; 47/DIG. 7
[58] Field of Search ............... 71/1, 24, 64 A, 64 R, 71/64 G, 64 SC, 66; 119/3, 5; 47/1, 2, 56, 58, 64, 74, 87, DIG. 7, DIG. 10

[56] References Cited

U.S. PATENT DOCUMENTS

| 2,961,994 | 11/1960 | Kopietz | 119/3 |
| 3,336,129 | 8/1967 | Herrett | 47/DIG. 7 |
| 3,799,755 | 3/1974 | Rack | 71/24 |
| 3,812,619 | 5/1974 | Wood et al. | 47/56 X |
| 3,877,172 | 4/1975 | Schwab et al. | 47/64 |
| 3,961,445 | 6/1976 | Rack | 47/74 |
| 3,973,355 | 8/1976 | McKenzie | 71/64 A |

*Primary Examiner*—Frank A. Spear, Jr.
*Assistant Examiner*—Ferris H. Lander
*Attorney, Agent, or Firm*—Berman, Aisenberg & Platt

[57] ABSTRACT

A molded nutrient-containing plant-growth medium secured to a weighted base permits the growth of plants in an aquarium without contaminating water in the aquarium with floating soil.

4 Claims, No Drawings

PLANT PLUG

BACKGROUND

There is a need in the aquarium field for means of using soil in aquariums for growing certain rooted aquatic plants. Prior to the present invention soil was placed in a small pot; the pot was carefully lowered into an aquarium with some sand or gravel on top of the soil to keep the soil from dispersing (by floatation) in the water of the aquarium; and then the pot was buried under gravel in the aquarium. Fish in the aquarium would inevitably disturb the gravel covering the pot, and the soil thereunder would disseminate throughout much of the aquarium.

PRIOR ART

Pruitt I [USPat. No. 2,988,441] alleged that when polymeric materials which are foamable (to form a stable open-celled foam structure) are mixed with plant nutrients in chemical combination with a water-insoluble ion-exchange resin and thereafter foamed, a stable synthetic water-insoluble foamed product (which provides a unitary plant-growing medium for intensive plant culture) results. This growing medium is purported to require no added nutrients, soil or other plant-supporting matrix. It is said to support good plant growth without exacting care, to require only watering and to be adaptable to small household or larger greenhouse, garden or decorative operations.

Pullen [USPat. No. 3,102,364] concerns transplanter pot compositions comprising bagasse pith, a celluslosic fibrous material, and one or more of the following materials: Spanish moss, a wet-strength resin and/or a fungicide.

Germano [Canadian Pat. No. 722,589] provides a synthetic plant-culture medium or carrier comprising an agglomerate with a binder. The synthetic medium or carrier, e.g. in the form of a block of any desired shape, preferably consists of an agglomerate with two types of particles having different properties; one may be a resilient synthetic substance capable of absorbing and retaining water, air and/or plant nutrition elements, whereas the other may comprise particles of at least one hard filler of organic or mineral origin.

Herret [USPat. No. 3,336,129] concerns formulations of, e.g., soil and/or known active agents or agricultural chemicals incorporated within or admixed with insoluble cross-linked polymeric materials. His plant growth media comprise minor amounts (in the order of from about 0.001 weight percent to about 5 weight percent or greater) of particulate insoluble cross-linked polymeric materials in admixture with major amounts of natural growth media. Natural growth media include soil, sand, peat moss and/or vermiculite. In addition, his plant growth media may, alternatively, contain active agents, such as water, fertilizer, herbicides, fungicides, nematocides, and/or insecticides, soil-conditioning agents as well as diluents. What is meant by active agents, soil-conditioning agents and diluents is well illustrated by exemplification.

Pruitt II [USPat. No. 3,373,009] concerns an integral nutrient plant growth medium having a stable, water-insoluble, open-celled foamed polymer matrix in which is intimately imbedded plant nutrients in a leach-resistant nutrient mixture.

Rack [USPat. No. 3,834,072] makes a shape-retaining substrate for a plant by reacting foaming-agent-free polyurethane constituents in situ with dried peatmoss, foam flakes and a plant-nutrient mixture.

Bishop [USPat. No. 3,842,537] provides a shaped solid plant-growth medium from water-soluble adhesive admixed with coconut-husk fiber and pulp. The medium is stated to have the ability to absorb moisture and nutrients that may be added thereto without becoming water-logged form over-watering.

Schwab [USPat. No. 3,877,172] is directed to a foamed hydrophilic plastic plant-growth medium which may contain one or more fillers, such as vermiculite, montmorillonite and perlite.

Glueck [USPat. No. 3,899,850] contemplates a shaped solid carrier body for a plant which comprises a mixture of foam flakes and nutritives bonded together by means of a non-water-soluble foamed-plastic binding agent. The carrier body includes filler materials, and the nutrient is preferably uniformly distributed throughout the foamed plastic so that it is gradually supplied to the plant and also easily absorbed by the latter.

In connection with plastic foam material a number of patents have issued which involve plastic foam of particular interest to the instant inventor. Some of these patents are reviewed:

Wood I [USPat. No. 3,812,618] relates to a method for preparing a seedfoam-fabric composite (wherein the foam is a crosslinked hydrophilic foam) for protecting seed during germination.

Wood II [USPat. No. 3,812,619] relates to horticultural foam structures using hydrophilic crosslinked polyurethane foam as a carrier, such foam allegedly providing an effective means to protect dormant seed, as well as means to sustain seed germination and plant growth. The foam can contain organic filler, such as humus, sand, vermiculite, nutrients, fertilizer, pesticide and dye, intimately combined therewith and uniformly distributed therein.

Wood III [USPat. No. 3,833,386] uses a similar hydrophilic foam as a precursor in the preparation of porous ceramic structures. Cogliano [USPat. No. 3,874,964] uses similar hydrophilic foam as carpet backing.

Wood IV [USPat. No. 3,889,417] contemplates a hydrophilic foam for seed germination and which may also contain fertilizer (nitrogen, potassium, potash and magnesium), insecticide, fungicide, nematocide, soil conditioner, mulch, dye, radiation-control substance, enzymes, hormones and/or vermiculite.

Wood V [USPat. No. 3.903,232] relates to foam structures prepared by using an isocyanate-capped polyoxyethylene polyol reactant with large amounts of an aqueous reactant.

HYPOL is the trademark for a presently-marketed foamable hydrophilic polymer.

SUMMARY OF THE INVENTION

A weighted plant plug for use in aquariums for rooting and growth aquatic plants in water comprises a growth-supporting and plant-holding (preferably hydrophilic foam composition substantially permanently bound to a solid weighted component which precludes the plant plug from floating in water.

The invention has several (product) aspects, each of which is an intermediate in the preparation of the weighted plant plug (e) and is not necessarily devoid of independent utility:

(a) A plant-food enriched admixture, e.g. one having equal parts by weight of loam, clay, peat moss and builders' sand;

(b) A substantially homogeneous composition comprising approximately equal volumes of admixture (a) and a plastic-foam-forming water/hydrophilic-prepolymer admixture, the volume ratio of water to prepolymer being, e.g. from about 7 to 1 to about 13 to 1, and preferably about 10 to 1;

(c) A substantially homogeneous composition comprising admixture (a) as filler in hydrophilic prepolymer which is subsequently water-cured to a water-retaining, non-rigid, open-cell foam, the amount of prepolymer being sufficient to sustain (after curing) the entire composition as an integral solid, the integral solid preferably comprising moisture;

(d) A substantially homogenous sand-filled and water-cured hydrophilic-prepolymer foam, the amount of prepolymer being sufficient (on curing) to sustain the cured foam as a rigid integral solid and the volume ratio of water to sand prior to prepolymer cure being, e.g., about 1 to 3; and (e) A composite shaped article having two ends, one end of which comprises a major proportion by volume and is of composition (c), whereas the other end of which serves as a weighting component and is foam (d) in which the volume ratio of water/prepolymer/sand (prior to prepolymer cure in situ) is, preferably, about 10/1/30; the two ends being firmly secured to each other, and the weighting component being sufficient to preclude the composite from floating in water.

The process aspects of the invention are apparent from the ensuing description.

An object of the instant invention is to provide a substrate which favors the rooting and growth of plants, even when submerged in water. Another object is to provide a substrate which will remain integral under conditions prevailing when submerged in aquarium water. A further object is to provide a substrate which will not float and which will tend to remain where placed on a surface submerged in water. A still further object is to provide the substrate in the form of hydrophilic foam. Other objects include chemically bound soil, such soil bound to nutrients and a plural-part substrate with the several parts firmly and substantially-permanently bonded together even when submerged in water over an extended period of time. Additional objects are apparent from the detailed description of the invention.

DETAILS

A plant-food-enriched admixture (a) of loam, clay, peat moss and builders' sand is prepared. The plant food comprises any ingredient which enhances or facilitates the growth or health of a plant as well as any ingredient which counteracts, retards or prevents attack of plant life by elements, conditions, microorganisms, parasites, insects, etc. Such plant food is primarily, but not necessarily, concerned with providing a source of nitrogen, phosphorus (e.g. in the form of phosphoric acid) and/or potassium (e.g. in the form of a potash) and includes one or more ingredients referred to by Herrett [U.S. Pat. No. 3,336,129] as an "active agent", defined as a material (organic, inorganic, organo-metallic or metallo-organic) which, when in contact or in close association with plants, alters, modifies or promotes their growth, their well-being or longevity either directly or indirectly. Available marketed plant foods having, e.g., equal parts by weight of sources of nitrogen, phosphours and potassim, such as "NUTRI-20", are suitable either alone or in combination with any other plant food.

The weight ratio of loam/clay/(peat moss)/builders' sand) can vary, e.g. independently, from about 0.8 to about 1.2 parts of each, but it is preferred to have substantially equal amounts by weight of each. The amount and precise type of plant-food enrichment are not critical factors beyond the limitation that the amount must be sufficient to effect its purpose in the context of the cured, water-retaining foam product filled therewith. It has been found that by increasing the amount of builders' sand so that the ratio of loam/clay/(peat moss)/(builders' sand) is about 1:1:1:1.2, the water-cured hydrophilic prepolymer foam is denser than water and will not float in an aquarium even without a separate weighting component.

By "loam" is meant any rich, dark soil. The term, "clay", is used to include natural plastic mixtures of silica and alumina, e.g. bentonite and montmorillonite, which contain other constituents. Peat moss is any plant, e.g. of the genus, Sphagnum, which becomes peat.

A hydrophilic foam-forming prepolymer is admixed with admixture (a) and with from about 7 to about 13, preferably about 10, times its volume of water before being cured into a substantially homogeneous, solid, water-retaining, non-rigid, open-cell foam. Since the prepolymer is thoroughly admixed with the components of admixture (a) prior to curing, such components act as filler for and an integral part of the resulting foam. The amount of prepolymer necessary is only that required to maintain the resulting cured foam integral both in air and when submerged in water. Ordinarily the volume of foam-forming prepolymer is from about one eighth to about one fourteenth that of admixture (a) combined therewith.

Any hydrophilic foam-forming prepolymer is useful for this purpose as long as the cured foam obtained therefrom is water-retentive, non-rigid, open-cell foam which is effectively water insoluble and non toxic to plants and to fish. The filled and cured foam must effectively retain its integrity even when submerged in water over prolonged periods of time. A water-curable plastic-foam-forming prepolymer is most advantageously employed for this purpose.

Suitable prepolymers are the foam-forming prepolymers disclosed by Wood [USPat. No. 3,812,618, USPat. No. 3,812,619 and USPat. No. 3,889,417] or by Cogliano [USPat. No.3,874,964]. Water-curable hydrophilic foam-forming polyurethane prepolymers of the type disclosed in these patents are particularly useful for the intendedpurpose.

The thus-prepared filled foam (plant-growth medium) chemically bonds and holds together the soil, plant food and other ingredients of which it is composed, and yet it permits roots to penetrate without hampering their growth. The bonding of components and the insolubility of the composite provides a product which will not cloud an aquarium in which it is submerged and is not adversely affected by under-gravel filters. The plant-growth medium is useful for sprouting seeds, starting (rooting) cuttings and growing terrestial house plants in addition to providing a substrate for growing plants submerged in an aquarium. Moreover, plants grown in such a plastic-foam medium are easily transplanted without disturbing their roots or shocking their growth.

Unfortunately, thus-filled foam is less dense than and thus floats in water. This is a deterrent to its use for growing aquatic plants in an aquarium. A, e.g., shaped volume of such foam can be weighted to an extent sufficient to preclude its floating in water. Any water-insoluble material which has a sufficiently-high density, is substantially non-toxic to plants and fish and will not deteriorate or decompose when submerged in water over prolonged periods is useful for this purpose, particularly if it can be firmly secured in or to the filled foam.

A weighting component which is particularly useful is prepared by admixing the same or a similar hydrophilic prepolymer with sand, the proportion of prepolymer being at least that required (after curing) to retain the sandfilled cured polymer as an integral solid. Since the sand is denser than the polymer, particularly when the prepolymer is a foam-forming prepolymer, the greater the ratio of sand to prepolymer, the greater the density of the sandfilled product.

If the same foam-forming hydrophilic prepolymer is employed, the volume ratio of water to prepolymer is, e.g., from about 7 to about 13 and preferably about 10, whereas the volume ratio of sand to prepolymer is from about 20 to about 35, preferably about 30.

When a shaped volume of plant-growth medium is cured concurrently and in contact with a shaped volume of sand-filled prepolymer (of the same type as used in the plant-growth medium), the polymer secures the two shaped volumes together at their interface to make an effectively permanent bond therebetween. The larger the interface, the more permanent and secure the bond.

The produced composite can be in any shape, e.g. the form of a right circular cylinder (one end of which is the weighting component) or that of a truncated cone (flower-pot shape). Likewise, if the filled and cured foam is prepared without a weighting component, it can also be in any desired shape.

When the shaped plant-growth medium (with or without a weighting component) is used for rooting a seed or a cutting or for growing a plant, it should be thoroughly wetted first. This can be accomplished by placing it in water and squeezing it from one end to the other a sufficient number of times, e.g. about ten, to remove most of the air therein. Then, slice (from one end) through about half of the foam and separate sufficiently to insert the roots, seed or cutting in the separation. If the foam does not spring back to essentially its precut position, a rubber band or other holding device can be used around the upper portion to hold the foam together. The stem of plant cuttings placed into the shaped foam should be free of leaves.

When the foam has a weighting component and is used in an aquarium, it need not be placed under gravel. If it is, it should not be covered by more than a fine layer. In any event, the "crown" of a plant should not be covered.

From the preceding description one skilled in the art can prepare and use the subject invention in each of its aspects. The following specific embodiments merely illustrative and do not, in any way, limit the remainder of the disclosure. In the examples which follow, quantities are expressed in parts by weight and in parts by volume. The relationship between parts by weight and parts by volume is the same as that between grams and cubic centimeters or between 62.5 pounds and one cubic foot.

EXAMPLE 1

Thoroughly mix 0.8 part by weight of each of loam, clay and peat moss with 1 part by weight of fine builders' sand and 0.2 part by weight of "NUTRI-20", a slow-release plant food having equal parts by weight of sources of nitrogen, phosphorus and potassium, to obtain a plant-food-enriched admixture (a).

EXAMPLE 2

Keeping all other amounts and components the same, repeat Example 1 with 1.2 parts by weight of fine builders' sand to obtain a similar plant-food-enriched admixture (a).

EXAMPLE 3

Thoroughly mix 1.2 parts by weight of each of loam, clay and peat moss with 1 part by weight of fine builders' sand and 0.3 part by weight of "NUTRI-20".

EXAMPLE 4

Keeping all other amounts and components the same, repeat Example 3 with 0.8 part by weight of fine builders' sand.

EXAMPLE 5

Thoroughly mix 0.8 part by weight of each of loam and clay with 1 part by weight of each of peat moss and fine builders' sand and 0.25 part by weight of "NUTRI-20".

EXAMPLE 6

Thoroughly mix 0.8 part by weight of each loam and peat moss with 1 part by weight of each of bentonite and fine builders' sand and 0.2 part by weight of "NUTRI-20".

EXAMPLE 7

Thoroughly mix 0.8 part by weight of each of each montmorillonite and peat moss with 1 part by weight of each of loam and fine builders' sand and 0.25 part by weight of "NUTRI-20".

EXAMPLE 8

Thoroughly mix 1 part by weight of each of loam, clay and fine builders' sand with 0.8 part by weight of peat moss and 0.3 part by weight of "NUTRI-20".

EXAMPLE 9

Thoroughly mix 1 part by weight of each of loam, peat moss and fine builders' sand with 0.8 part by weight of china clay and 0.2 part by weight of "NUTRI-20".

EXAMPLE 10

Thoroughly mix 1 part by weight of each of clay, peat moss and fine builders' sand with 0.8 part by weight of loam and 0.25 part by weight of "NUTRI-20".

EXAMPLE 11

Thoroughly mix 1 part by weight of each of loam, bentonite, peat moss and fine builders' sand with 0.3 part by weight of "NUTRI-20".

EXAMPLE 12

Thoroughly mix 0.8 part by weight of each of loam and clay with 1.2 parts by weight of sphagnum, 1 part of weight of fine builders' sand and 0.2 part by weight of "NUTRI-20".

EXAMPLE 13

Thoroughly mix 0.8 part by weight of each of loam and peat moss with 1.2 parts by weight of montmorillonite, 1 part by weight of fine builders' sand and 0.25 part by weight of "NUTRI-20".

EXAMPLE 14

Thoroughly mix 0.8 part by weight of each of clay and peat moss with 1.2 parts by weight of loam, 1 part by weight of fine builders' sand and 0.3 part by weight of "NUTRI-20".

EXAMPLE 15

Thoroughly mix 1.2 parts by weight of each of loam and peat moss with 0.8 part by weight of china clay, 1 part by weight of fine builders' sand and 0.2 part by weight of "NUTRI-20".

EXAMPLE 16

Thoroughly mix 1.2 parts by weight of each of loam and clay with 0.8 part by weight of peat moss, 1 part by weight of fine builders' sand and 0.25 part by weight of "NUTRI-20".

EXAMPLE 17

Thoroughly mix 0.8 part by weight of loam with 1.2 parts by weight of each bentonite and peat moss, 1 part by weight of fine builders' sand and 0.3 part by weight of "NUTRI-20", a water-soluble mix with trace elements and iron chelete.

EXAMPLE 18

Thoroughly mix 1 part by weight of each of loam, clay and fine builders' sand with 1.2 parts by weight of sphagnum and 0.2 part by weight of "SUPERTHRIVE", a multiple-vitamin and hormone plant-food mix.

EXAMPLE 19

Thoroughly mix 1 part by weight of each of loam, peat moss and fine builders' sand with 1.2 parts by weight of montmorillonite and 0.25 part by weight of "OSMOCOTE", an 18-6-12 (relative proportions of sources of nitrogen, phosphorus and potassium, respectively) slow-release fertilizer.

EXAMPLE 20

Thoroughly mix 1.2 parts by weight of loam with 1 part by weight of each clay, peat moss and fine builders' sand and 0.3 part by weight of "NUTRI-20".

EXAMPLE 21

Thoroughly mix 1.2 parts by weight of each of loam and china clay with 1 parts by weight of peat moss and fine builders' sand and 0.1 part by weight of each of "SUPERTHRIVE" and "NUTRI-20".

EXAMPLE 22

Thoroughly mix 1.2 parts by weight of each of loam and peat moss with 1 part by weight of each of clay and fine builders' sand and 0.25 part by weight of "OSMOCOTE".

EXAMPLE 23

Thoroughly mix 1 part by weight of each of loam and fine builders' sand with 1.2 parts by weight of each of bentonite and sphagnum and 0.15 part by weight of each of "OSMOCOTE" and "SUPERTHRIVE".

EXAMPLE 24

Keeping all other amounts and components the same, repeat each of Examples 5 through 23 with 0.8 part by weight of fine builders' sand to obtain corresponding plant-food-enriched admixtures. (a).

EXAMPLE 25

Keeping all other amounts and components the same, repeat each of Examples 5 through 23 with 1.2 parts by weight of fine builders' sand to obtain corresponding plant-food-enriched admixtures (a).

EXAMPLE 26

Thoroughly mix the product of Example 1 with an equal volume of foamable hydrophilic polyurethane prepolymer ["HYPOL FHP2000"] and water, the volume ratio of water to prepolymer being 10 to 1. [The volume ratio of water:prepolymer:(product of Example 1) is thus 10:1:11.] Pour the resulting slurry into open-ended 1.25-inch cylindrical molds having a diameter of about 1.5 inches and resting on a polyethylene-coated table to obtain plant-growth medium, which is a water-cured, water-retaining, nonrigid, open-cell, integral-solid foam (c), in right-circular-cylindrical shape.

EXAMPLE 27

Keeping all amounts and all other components the same, repeat Example 26 with "HYPOL FHP3000" in place of "HYPOL FHP2000" to obtain the corresponding plant-growth medium.

EXAMPLE 28

Keeping all components and all other amounts the same, repeat Examples 26 and 27 with a water/prepolymer admixture in which the volume ratio of water to prepolymer is 7 to 1 to obtain the corresponding plant-growth meduim.

EXAMPLE 29

Keeping all components and all other amounts the same, repeat Examples 26 and 27 with a water/prepolymer admixture in which the volume ratio of water to prepolymer is 13 to 1 to obtain the corresponding plant-growth medium.

EXAMPLE 30

Keeping all amounts and all other components the same, repeat each of Examples 26 through 29 with the plant-food-enriched admixture (a) of each of Examples 2 through 25 to obtain the corresponding plant-growth media.

EXAMPLE 31

Thoroughly admix 1 part by volume of "HYPOL FHP3000" with 10 parts by volume of water and 30 parts by volume of sand. Pour the resulting admixture into open-ended 0.5-inch high cylindrical molds having a diameter of about 1.5 inches and resting on a polyethylene-coated table.

EXAMPLE 32

Repeat Example 31 with the same volume of "HYPOL FHP2000" in place of the "HYPOL FHP3000".

EXAMPLE 33

Before the individual moldings from Examples 31 and 32 have a chance to cure, place directly on each of them a plant-growth medium from any of Examples 26 through 30 before the selected plant-growth medium is fully cured. In this way the plant-growth medium cures with and substantially permanently bonds to the weighting component (molding from Example 31 or Example 32); the prepolymer in each segment polymerizes with that in the other segment with which it is in direct contact.

Example 34

Repeat Example 33 to provide plant-growth medium from each of Examples 1 through 30 with a weighting component from Example 31 or from Example 32.

From the foregoing description and examples, one skilled in the art can readily ascertain the essential features of the invention. Various changes and modifications are apparent without departing from the spirit of scope therof. It is clear that the size or shape of the plant-growth medium (whether weighted or not) is not critical beyond requirements for a particular application.

What is claimed is:

1. A weighted water-retaining, non-rigid, open-cell, substantially homogeneous polyurethane-foam/soil composition comprising moisture and a plant food enriched admixture of loam, clay, peat moss and builders' sand integrally incorporated as filler in sufficient water-cured hydrophilic-polyurethane-prepolymer foam to sustain the composition as an integral solid which has a sufficiently-high average density to preclude its floating in water.

2. A composite shaped article according to claim 1 and having two ends, one end of which comprises a major proportion by volume and is of a water-retaining, non-rigid, open-cell, substantially-homogeneous polyurethane-foam/soil composition comprising moisture and a plant food enriched admixture of loam, clay, peat moss and builders' sand and the other end of which serves as a weighting component and is of a substantially homogeneous polyurethane-foam/sand composition comprising sand and sufficient water-cured hydrophilic-polyurethane-prepolymer foam to sustain it as a rigid, integral solid, the volume ratio of water to sand before prepolymer cure in said other end being approximately 1 to 3; the two ends being firmly secured to each other, and the weighting component being sufficient to preclude the composite article from floating in water.

3. A composite shaped article according to claim 2 wherein the two ends are secured together by concurrent water-curing in contact with each other.

4. A process for preparing a composite shaped article according to claim 2 which comprises supporting partially-uncured shaped plant-growth medium on the uncured weighting component while the latter is in a mold and permitting the prepolymer of the weighting component to cure in contact with partially-cured prepolymer in the plant-growth medium to form a strong bond therebetween.

* * * * *

UNITED STATES PATENT AND TRADEMARK OFFICE
CERTIFICATE OF CORRECTION

PATENT NO. : 4,074,997
DATED : February 21, 1978
INVENTOR(S) : MERRILL COHEN

It is certified that error appears in the above-identified patent and that said Letters Patent are hereby corrected as shown below:

Column 2, lines 59 and 67, "plant plug" should read --Plant Plug-- at each occurrence.

Signed and Sealed this

Third Day of October 1978

[SEAL]

Attest:

RUTH C. MASON
Attesting Officer

DONALD W. BANNER
Commissioner of Patents and Trademarks